(12) United States Patent
Alexander

(10) Patent No.: US 7,801,890 B1
(45) Date of Patent: Sep. 21, 2010

(54) METHODS AND APPARATUS TO IDENTIFY ACCESSED DIGITAL CONTENT

(75) Inventor: James M. Alexander, Mount Kisco, NY (US)

(73) Assignee: Adobe Systems Inc., San Jose, CA (US)

( * ) Notice: Subject to any disclaimer, the term of this patent is extended or adjusted under 35 U.S.C. 154(b) by 1170 days.

(21) Appl. No.: 11/183,462

(22) Filed: Jul. 18, 2005

(51) Int. Cl.
*G06F 7/00* (2006.01)
*G06F 17/00* (2006.01)

(52) U.S. Cl. ........................ 707/732; 707/770
(58) Field of Classification Search ........................ None
See application file for complete search history.

(56) References Cited

U.S. PATENT DOCUMENTS

| | | | | |
|---|---|---|---|---|
| 6,189,008 | B1 * | 2/2001 | Easty et al. | 707/10 |
| 6,477,530 | B1 * | 11/2002 | Omata et al. | 707/9 |
| 2002/0107832 | A1 * | 8/2002 | Shimizu et al. | 707/1 |
| 2002/0133491 | A1 * | 9/2002 | Sim et al. | 707/10 |
| 2002/0165937 | A1 * | 11/2002 | Nitta et al. | 709/217 |
| 2002/0165987 | A1 * | 11/2002 | Arisaka et al. | 709/246 |
| 2002/0186241 | A1 * | 12/2002 | Kohda et al. | 345/744 |
| 2003/0110126 | A1 * | 6/2003 | Dunkeld et al. | 705/39 |
| 2004/0034601 | A1 * | 2/2004 | Kreuzer | 705/52 |
| 2004/0133448 | A1 * | 7/2004 | Higashi et al. | 705/1 |
| 2004/0133847 | A1 * | 7/2004 | Iino et al. | 715/500 |
| 2004/0199527 | A1 * | 10/2004 | Morain et al. | 707/100 |
| 2005/0125456 | A1 * | 6/2005 | Hara et al. | 707/200 |
| 2005/0210042 | A1 * | 9/2005 | Goedken | 707/100 |
| 2006/0080306 | A1 * | 4/2006 | Land et al. | 707/3 |

FOREIGN PATENT DOCUMENTS

JP  2002091955 A  * 3/2002

* cited by examiner

*Primary Examiner*—Pierre M Vital
*Assistant Examiner*—Berhanu Mitiku
(74) *Attorney, Agent, or Firm*—Chapin IP Law, LLC

(57) ABSTRACT

A system identifies purchasable digital content to be used in development of a digital composition by receiving a request to identify a set of digital content, and retrieving access history for individual portions of digital content that match the request. The access history includes a number of times the individual portions of digital content have been accessed. The system then produces a set of digital content indicative of the access history for each individual portion of digital content, and outputs the set of digital content that matches the request, and that reflects the access history for individual portions of digital content.

22 Claims, 7 Drawing Sheets

217 OUTPUTS THE SET OF DIGITAL CONTENT THAT MATCHES THE REQUEST AND THAT REFLECTS THE ACCESS HISTORY FOR INDIVIDUAL PORTIONS OF DIGITAL CONTENT

219 DISPLAYS A REPRESENTATION OF AT LEAST A PORTION OF THE ACCESS HISTORY ALONG WITH THE DIGITAL CONTENT

220 DISPLAYS A RENDITION OF EACH INDIVIDUAL PORTION OF DIGITAL CONTENT IN THE SET OF DIGITAL CONTENT WITH AN INDICATOR, THE INDICATOR IDENTIFYING PURCHASE INFORMATION FROM THE ACCESS HISTORY ASSOCIATED WITH EACH INDIVIDUAL PORTION OF DIGITAL CONTENT

221 DISPLAYS A PURCHASE METRIC AS A GRAPHICAL INDICATOR REPRESENTING A NUMBER OF TIMES EACH INDIVIDUAL PORTION OF DIGITAL CONTENT IS VIEWED VERSUS A NUMBER OF TIMES EACH INDIVIDUAL PORTION OF DIGITAL CONTENT IS PURCHASED

OR

222 DISPLAYS A PURCHASE METRIC AS A GRAPHICAL INDICATOR OF PURCHASES MADE WITHIN A PREDETERMINED PERIOD OF TIME IDENTIFIED BY A RISK METRIC

*FIG. 6*

METHODS AND APPARATUS TO IDENTIFY ACCESSED DIGITAL CONTENT

BACKGROUND

Conventional computerized devices, such as personal computers, laptop computers and the like allow document developers to connect to a network such as the Internet to view digital content available for purchase from content providers. Content providers provide servers on such networks that allow merchants to display purchasable digital content (e.g., photography, graphics, etc) for document developer customers to purchase online. Customers are able to perform online searches by providing search criteria such as keywords, and then choose from the results to make their purchase. As an example, if a document developer is looking for pictures of cars, they can visit a content provider web site that sells digital pictures and can enter the search term "cars". In response, the content provider web site searches a library of digital content (that may include more than one content provider web site) and can compile the results of the search. The content provider web site typically displays the results of the search to the customer in the form of reduced size low resolution snapshots of the purchasable content (i.e. "thumbnail images"), and for each thumbnail image, provides an item description such as a picture title, and purchase price. Such content provider sites often allow the developer/customer to download a reduced quality version of the image that they want to use in their document to produce a draft copy of the document. If the draft copy is acceptable, the developer/customer can download a high-resolution version of that image for use in the production run of the document. Once the customer purchases the digital content in this manner, the purchased items are then downloaded to the customer.

In general, there are two varieties of digital images available for purchase: rights-managed images and royalty-free images. Content providers that sell rights-managed images provide controls to track what type of industry is purchasing such images and how many copies of the image are being used in a production run. As an example, suppose a drug company is developing marketing materials for a new drug that helps ailing elderly people. The developer of such marketing material may require an image of an elderly person in a wheelchair. The developer can search for and purchase a rights-managed image that shows an elderly person in a wheelchair from a content provider web site. During the purchase process, the web site system that sells the image receives a description of the type of industry for which the image is going to be used. This information is stored in a record that is associated with the image so that subsequent purchasers (or would-be purchasers) can identify past purchasers of the rights-managed image. Thus one purpose for tracking the type of industry and/or document in which the image is being used is to provide some feedback to future potential purchasers about who has purchased this same image in the past. Using the drug company example, if a second drug company also needs an image of a person in a wheelchair for drug marketing purposes, the content developer for this second drug company can review the purchase history for the rights managed image and can identify that another drug company has used this same image for a similar purposes. The content developer for the second drug company can thus avoid a potentially embarrassing situation of using the same image in a similar marketing campaign. Rights-managed images tend to be more expensive than royalty free images in part due to the more controlled environment in which they are sold.

SUMMARY

Royalty-free images are also sold via content provider web sites. However, conventional systems to displaying and providing purchase mechanisms for royalty free content provide no controls to track purchases of royalty free images. Accordingly, conventional web sites that sell such images simply provide the list of royalty-free images in thumbnail form and allow any number of developers to purchase the same image. There are no mechanisms or controls in place to track what type of document the images are used in, nor are there any mechanisms to identify how many former purchases have been made for a particular portion of content such as a digital image. Accordingly, there is a need for a system to provide marketing clients/developers who are searching for digital content with more information about the digital content than just a thumbnail image, image description (e.g., title) and price. Such developers may also be interested in information such as whether or not the chosen image(s) have been purchased for use in other marketing campaigns. As noted above, marketing clients do not want to use digital content that has been used in previous marketing campaigns for fear that potential customers will see the previously used digital content, and associate the digital content with the company that previously used the digital content, or worse, associate the digital content with the marketing clients' competitors.

As noted above, conventional rights-managed systems maintain associated data on the types of industries in which an image is being used. However, royalty-free and rights-managed systems do not provide controls or tracking system concerning how many purchases have been made, and how many times content has been viewed in relation to each images. Such purchase history information can serve as a risk metric or risk profile to assist marketing client or content developers by providing a way of determining the best digital content to use for their marketing campaigns. Marketing clients use information such as past purchase history as a way of managing this risk.

From the foregoing, conventional technologies for providing customers with purchasable digital content suffer from a variety of deficiencies. In particular, conventional technologies that provide customers with digital content are limited in that the digital content is presented to the customers for access without providing additional information, such as past access numbers indicating how many people viewed and/or purchased a particular portion of content. As a result, customers could potentially purchase digital content that is already in use by a competitor, or by another company with whom the customer does not wish to be associated (i.e. a government agency would not want to use the same digital content as an escort service). It should be noted that purchasing digital content can include, but is not limited to leasing the digital content, downloading the digital content, or authorized hyper linking to the digital content.

Embodiments disclosed herein significantly overcome such deficiencies and provide a system that includes a computer system executing a digital content identifying process. The digital content identifying process receives a request to identify a set of digital content, and retrieves access history for individual portions of digital content that match the request. The request may also include search criteria to further narrow the set of digital content. The search criteria might relate to whether or not the digital content has been accessed, or whether or not the digital content has been accessed within a specific time period, for example, six months. The digital content identifying process then produces a set of digital content indicative of the access history for each individual portion of digital content, and displays the set of digital content that reflects the access history for individual portions of digital content that match the request. Each individual portion of digital content is displayed with an indicator representing the access history (i.e. the viewing and/or purchasing history). The indicator could be a numeric value, such as the actual number of times the individual portion of digital content has been accessed, or it could be a fractional representation of the number of times the digital content has been viewed versus the number of times the digital content has been purchased. The indicator could be in the form of a graphical indicator, such as a meter (indicating the number of views and/or purchases), or a thermometer.

During an example operation of one embodiment, suppose a customer wants to access a photograph of a golf course to use within a brochure for a charity event. The customer performs an online search for "golf course" at a website that offers digital content for sale. The digital content identifying process receives the request to identify a set of photographs that are related to golf courses. Using "golf course" as a search criteria, the digital content identifying process retrieves photographs of golf courses, and the access history related to the golf course photographs by comparing the search criteria to a digital content database containing photographs and other digital content, and then identifying access history for those records, within the digital content database, that match the search criteria. The digital content identifying process produces a set of golf course related photographs, along with the associated access history, and displays the golf course related photographs, along with the associated access history. In one configuration, the access history contains the number of times the photograph has been viewed by potential customers (indicating relative popularity of the photograph by other potential customers). In one configuration, the access history contains information pertaining to whether or not the photograph has been accessed, and if so, how many times the photograph has been accessed. A customer, for example, an organizer of a charity event, might want to purchase photographs that haven't been purchased by any other customers, or haven't been purchased by other customers within a specific time period, for example, within the past six months. In one configuration, the digital content identifying process displays the golf course photographs with a access metric indicating the number of times the photograph has been viewed versus the number of times the photograph has been accessed. This information enables a customer to choose photographs that have the desirable dual qualities of being most popular, yet least used.

Other embodiments of the disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The features disclosed herein, may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 illustrates a flowchart of a procedure performed by the system of FIG. 1 when the digital content identifying process outputs the set of digital content that matches the request, and that reflects the access history for individual portions of digital content, according to one embodiment disclosed herein.

DETAILED DESCRIPTION

Embodiments disclosed herein include a computer system that performs a digital content identifying process that receives a request to identify a set of digital content, and retrieves access history for individual portions of digital content that match the request. The digital content identifying process then produces a set of digital content indicative of the access history for each individual portion of digital content, and displays the set of digital content that reflects the access history for individual portions of digital content that match the request. Access history can contain information for each image such as the number of purchases made of the image, the number of times the image was viewed, a type of industry that used the image, and so forth. In one configuration, the system produces a set of digital content indicative of the access history for each individual portion of digital content by excluding from the set of digital content any images for which the access history meets some threshold risk metric.

For example, in one configuration, an operator can specify that a risk metric is one or more purchases, the thus any images that have been purchased in the past are excluded from the set of images presented to the operator for purchase. In another configuration, a user can set the threshold metric to a value and if the access history for any images indicates a access history (e.g., a number of tie an image was accessed) that exceeds the value of the risk metric, then those images are excluded from the set of digital content to be displayed to the operator.

In another configuration, all images may be shown, even if purchased any number of times, but the set of digital content produced reflects the access history by displaying a purchase history indicator that shows the operator how many times the content has been purchased. In a more robust embodiment, the access history indicator can be a chart, graph, histogram or other indicator that shows a number of accesses made and a time when they were made. For example, the access indicator or access history indicator can identify for various windows of past time (e.g., 1-2 months, 2-6 months, 6 months-1 year, etc.) how many accesses were made of a particular portion of content. Thus the set of digital content produced by the system of the invention can reflect the access history either by excluding images if their access history exceeds a risk metric, or can include images but can show the access history in the form of purchase history metrics displayed to the user in a variety of ways. In a simple case, the system can simply display a numerical value indicating how many times the image has been accessed.

Further details concerning the unique manner in which the system disclosed herein provides identification of digital content will now be provided with respect to the Figures and the discussion below.

Figure 1:
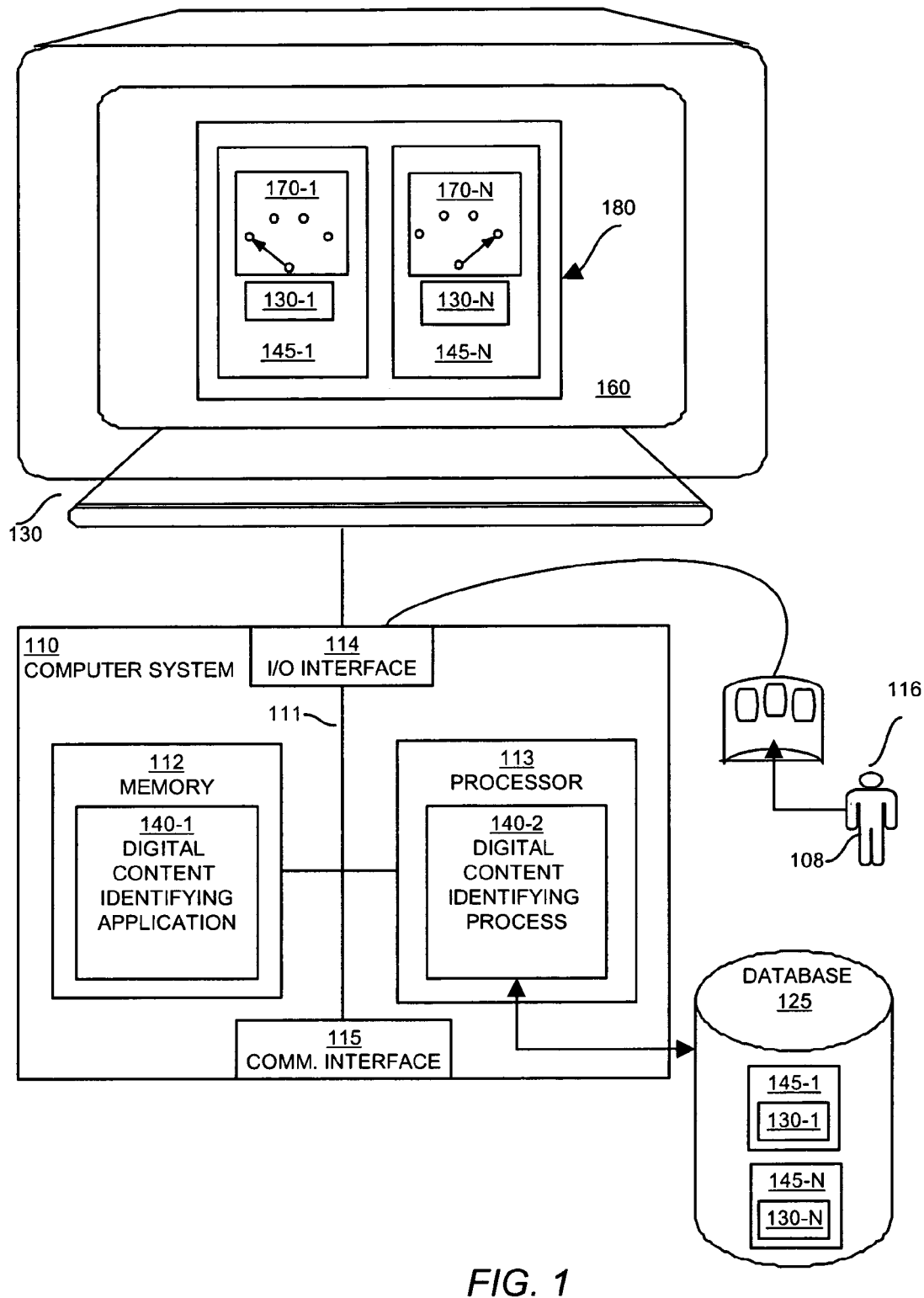
FIG. 1 shows a high-level block diagram of a computer system according to one embodiment disclosed herein.

FIG. 1 is a block diagram illustrating example architecture of a computer system 110 that executes, runs, interprets, operates or otherwise performs a digital content identifying application 140-1 and process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114 and enables a user 108 such as a graphics designer to provide input commands and generally control the graphical user interface 160 containing a set of digital content 180 including individual portions of digital content 145-N each including an indicator 170-N, and an access history 130-N that the digital content identifying application 140-1 and process 140-2 provides on the display 130. Also in this example configuration, a digital content database 125 stores individual portions of digital content 145-N containing access history 130-N developed in accordance with techniques described herein within a computer readable medium. The communications interface 115 enables the computer system 110 to communicate with other devices (i.e., other computers) on a network (not shown). This can allow access to the digital content identifying application by remote computer systems.

The memory system 112 is any type of computer readable medium and in this example is encoded with a digital content identifying application 140-1 that supports generation, display, and implementation of functional operations of the graphical user interface 160 as explained herein. The digital content identifying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the digital content identifying application 140-1. Execution of digital content identifying application 140-1 in this manner produces processing functionality in a digital content identifying process 140-2. In other words, the digital content identifying process 140-2 represents one or more portions or runtime instances of the digital content identifying application 140-1 (or the entire application 140-1) performing or executing within or upon the processor 113 in the computerized device 110 at runtime. The digital content identifying process 140-2 operates as explained herein to identify a set of digital content 180 containing individual portions of digital content 145-N within the graphical user interface 160.

It is noted that example configurations disclosed herein include the digital content identifying application 140-1. The digital content identifying application 140-1 may be stored on a computer readable medium (such as a floppy disk), hard disk, electronic, magnetic, and optical or other computer readable medium. The digital content identifying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the digital content identifying application 140-1 in the processor 113 as the digital content identifying process 140-2. Those skilled in the art will understand that the computer system 110 may include other processes and/or software and hardware components, such as an operating system not shown in this example.

A display 130 need not be coupled directly to computer system 110. For example, the digital content identifying application 140-1 can be executed on a remotely accessible computerized device via the network interface 115. In this instance, the graphical user interface 160 may be displayed locally to a user of the remote computer and execution of the processing herein may be client-server based.

Further details of configurations explained herein will now be provided with respect to a flow chart of processing steps that show the high level operations disclosed herein to perform the digital content identifying process 140-2.

Figure 2:
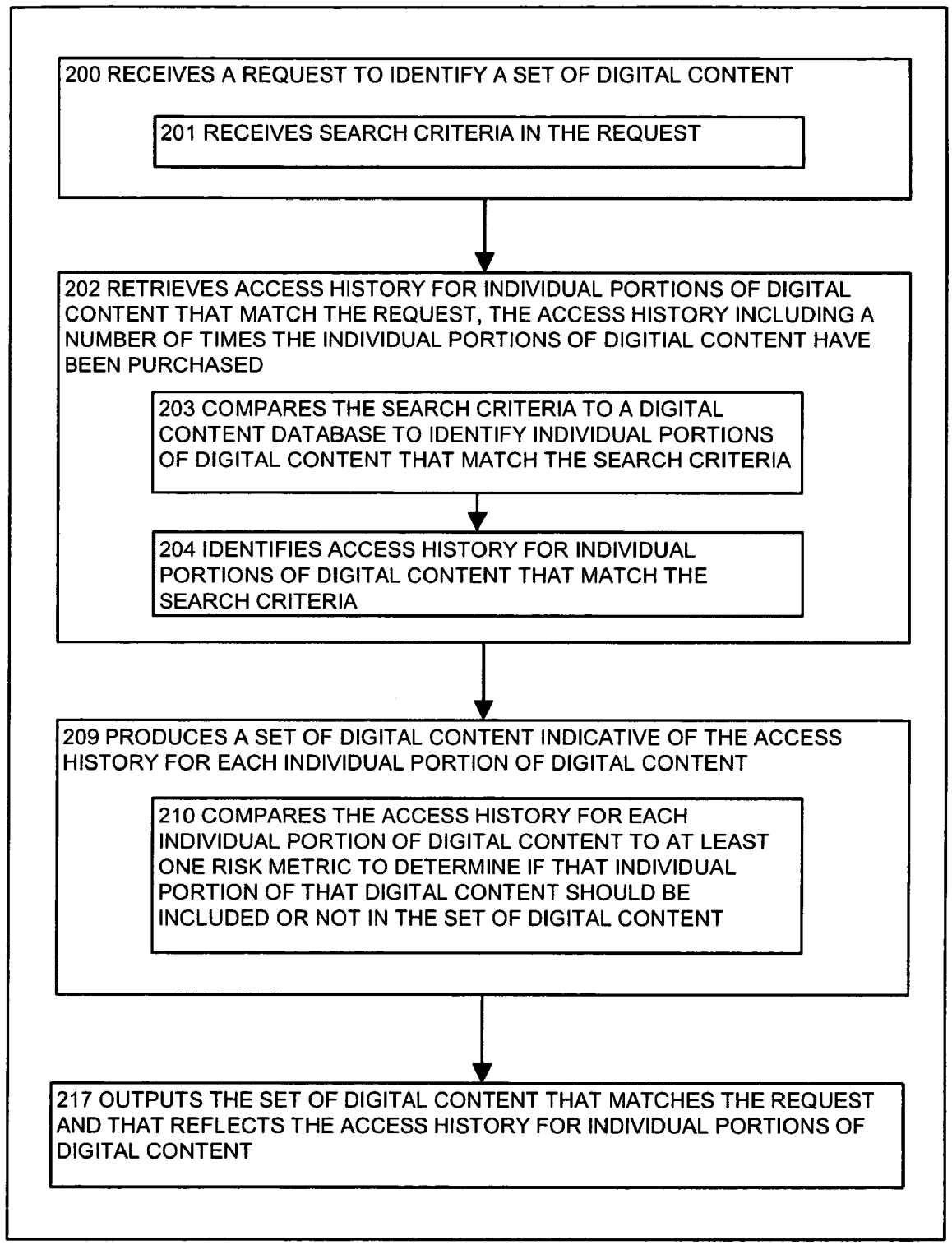
FIG. 2 illustrates a flowchart of a procedure performed by the system of FIG. 1 when the digital content identifying process receives a request to identify a set of digital content, according to one embodiment disclosed herein.

FIG. 2 is a flowchart of the steps performed by the digital content identifying process 140-2 when it receives a request to identify a set of digital content 180. The request to identify a set of digital content 180 can be initiated by a user 108, via the graphical user interface 160, or from another process, such as an automated search request.

In step 200, the digital content identifying process 140-2 receives a request to identify a set of digital content 180. A user 108, initiating this request, might want to access images that have not been used by others, or images that have not been accessed within a specific time frame, for example, within the past six months.

In step 201, the digital content identifying process 140-2 receives search criteria in the request. The search criteria identify the specific set of digital content 180 within the digital content database 125 containing all of the digital content that the digital content identifying process 140-2 is requested to identify. The search criteria can be related to the subject matter of the digital content, for example, "cars", "puppies", "infants", etc. The search criteria can also be related to whether or not the digital content has been previously viewed or purchased. The search criteria can also be related to a time frame in which the search criteria has been viewed and/or purchased. For example, a user 108 could specify the search criteria as, "images of puppies that have been viewed more than 20 times within the past month, but have not been purchased within the past six months".

In step 202, the digital content identifying process 140-2 retrieves access history 130-N for individual portions of digital content 145-N that match the request. The digital content identifying process 140-2 retrieves access history 130-N from the digital content database 125. The access history 130-N contains information relating to viewings and purchases of each of the individual portions of digital content 145-N within the digital content database 125.

In step 203, the digital content identifying process 140-2 compares the search criteria to a digital content database 125 to identify individual portions of digital content 145-N that match the search criteria. For example, if a user 108 searches on "images of puppies", the digital content identifying process 140-2 compares the search request of "puppies" to the images contained within the digital content database 125, to find those images that have subject matter related to "puppies".

In step 204, the digital content identifying process 140-2 identifies access history 130-N for individual portions of digital content 145-N that match the search criteria. Once the digital content identifying process 140-2 has retrieved the digital content from the digital content database 125 that matches the search criteria, the digital content identifying process 140-2 identifies the access history 130-N for each of the individual portions of digital content 145-N. The access history 130-N is identified by the digital content identifying process 140-2 retrieving this information from the digital content database 125 in the same manner that the digital content was retrieved from the digital content database 125.

In step 209, the digital content identifying process 140-2 produces a set of digital content 180 indicative of the access history 130-N for each individual portion of digital content 145-N. After both the digital content and the access history 130-N related to the search criteria have been retrieved from the digital content database 125, the digital content identifying process 140-2 produces a set of digital content 180 using this data.

In step 210, the digital content identifying process 140-2 compares the access history 130-N for each individual portion of digital content 145-N to at least one risk metric to determine if that individual portion of that digital content 145-N should be included or not in the set of digital content 180. A risk metric might be a user's 108 requirement such as "images that have not been accessed within the past six months".

In step 217, the digital content identifying process 140-2 outputs the set of digital content 180 that matches the request and that reflects the access history 130-N for individual portions of digital content 145-N. Once the set of digital content 180 has been created, containing the digital content that matches the search criteria, the digital content identifying process 140-2 outputs the set of digital content 180, for example, on a graphical user interface 160 for viewing by potential customers.

Figure 3:
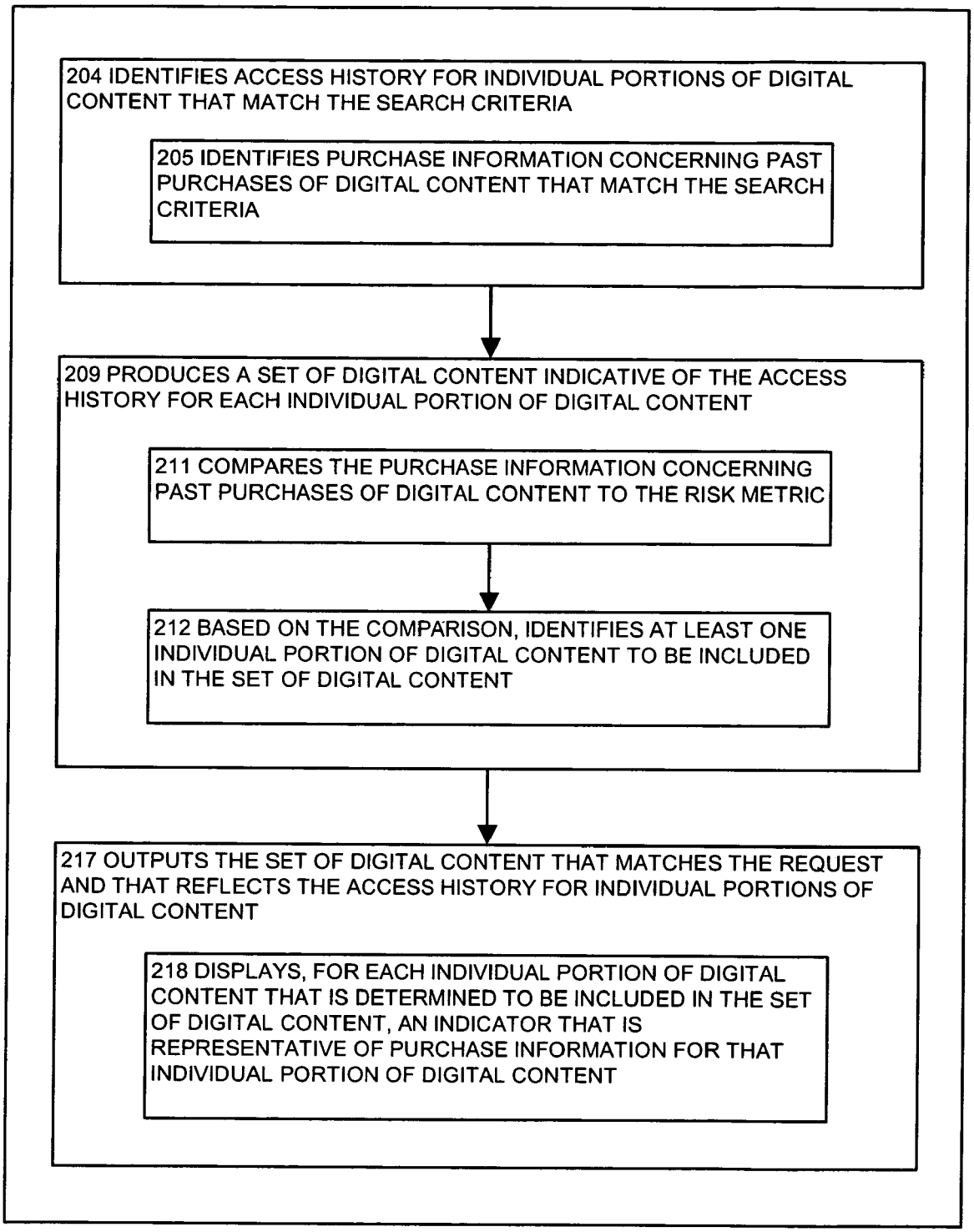
FIG. 3 illustrates a flowchart of a procedure performed by the system of FIG. 1 when the digital content identifying process identifies access history for individual portions of digital content that match the search criteria, according to one embodiment disclosed herein.

FIG. 3 is a flowchart of the steps performed by the digital content identifying process 140-2 when it identifies access history 130-N for individual portions of digital content 145-N that match the search criteria. The access history 130-N contains both viewing history (i.e. how many times potential customers have viewed the image) as well as purchase history (i.e. the actual number of times that particular image has been purchased by a customer).

In step 205, the digital content identifying process 140-2 identifies access information concerning past accesses of digital content that match the search criteria. Access history is of value to customers who do not want to use digital content, for example, images that have been used by other customers. By not using digital content that has been accessed by others, a customer can eliminate the chance of re-using an image previously used by that customer's competitor(s).

In step 211, the digital content identifying process 140-2 compares the access information concerning past accesses of digital content to the risk metric. After the digital content identifying process 140-2 produces a set of digital content 180 indicative of the access history 130-N for each individual portions of digital content 145-N, the digital content identifying process 140-2 compares the access history to the risk metric. The access history, for example, could include information such as whether or not the digital content has been accessed and/or whether or not the digital content has been accessed within the previous six months. The risk metric might identify a risk, such as digital content that has been accessed within the past six months.

In step 212, the digital content identifying process 140-2 based on the comparison, identifies least one individual portion of digital content 145-N to be included in the set of digital content 180. Once the digital content identifying process 140-2 compares the access history of the individual portion of digital content 145-N to the risk metric, the digital content identifying process 140-2 identifies which of the digital content within the digital content database 125 should be included within the set of digital content 180.

In step 218, the digital content identifying process 140-2 displays, for each individual portion of digital content 145-N that is determined to be included in the set of digital content 180, an indicator 170-N that is representative of access information for that individual portion of digital content 145-N. When the digital content identifying process 140-2 displays the set of digital content 180 that matches the access history 130-N for individual portions of digital content 145-N, the digital content identifying process 140-2 also displays an indicator 170-N that represents the access history for each of the individual portions of digital content 145-N included within the set of digital content 180.

Figure 4:
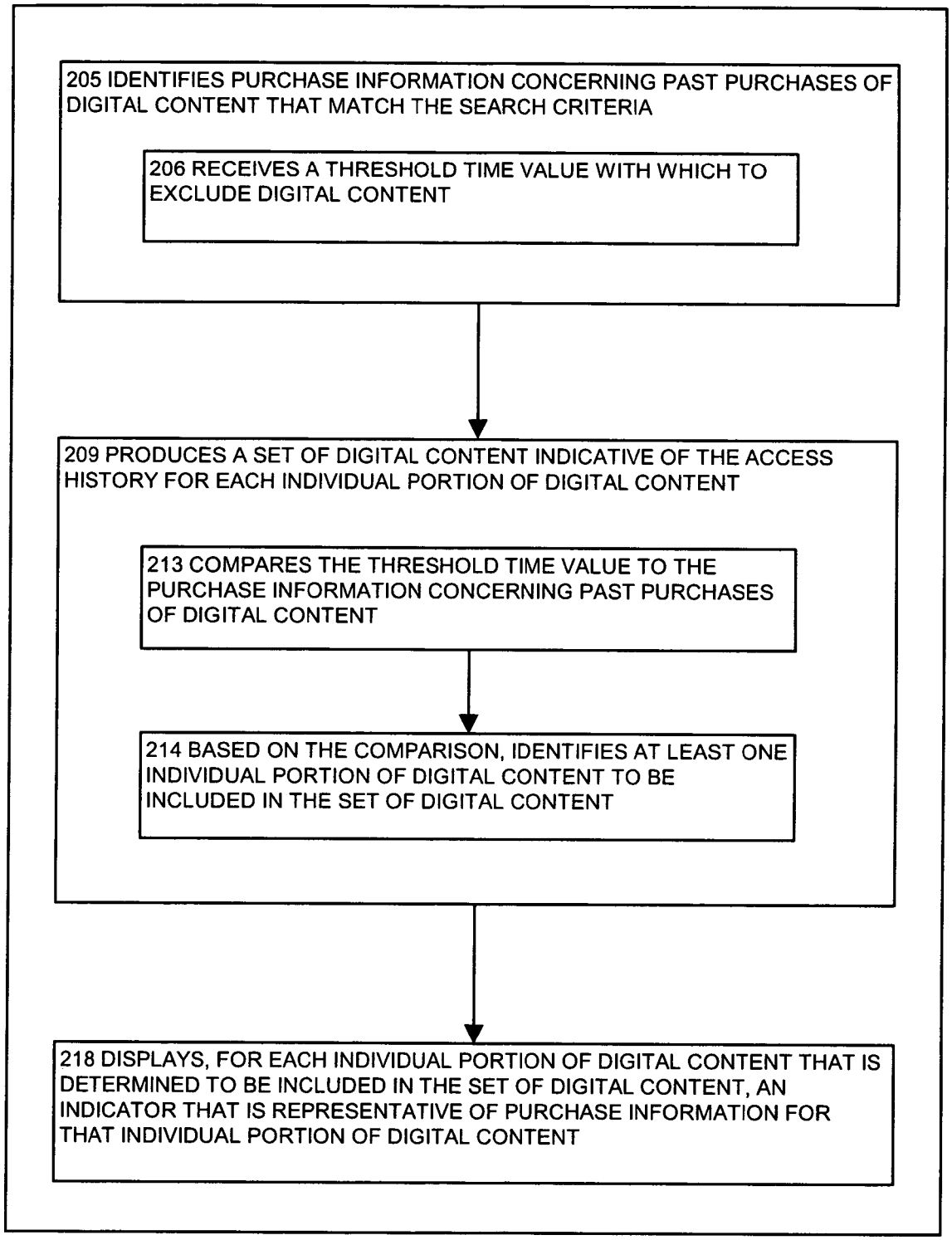
FIG. 4 illustrates a flowchart of a procedure performed by the system of FIG. 1 when the digital content identifying process identifies access information concerning past accesses of digital content that match the search criteria, according to one embodiment disclosed herein.

FIG. 4 is a flowchart of the steps performed by the digital content identifying process 140-2 when it identifies access information concerning past accesses of digital content that match the search criteria. Access information relates to both whether or not the digital content has been accessed as well as a timestamp of when the digital content was access.

In step 206, the digital content identifying process 140-2 receives a threshold time value with which to exclude digital content. After the digital content identifying process 140-2 identifies access information concerning past accesses of digital content that matches the search criteria, in one configuration, the digital content identifying process 140-2 receives a time value, for example, "digital content that has not been accessed within the past six months".

In step 213, the digital content identifying process 140-2 compares the threshold time value to the access information concerning past accesses of digital content. The digital content identifying process 140-2 produces a set of digital content 180 indicative of the access history 130-N for each individual portions of digital content 145-N by comparing the threshold time value to the access information. The access information is contained within the access history 130-N that was retrieved by the digital content identifying process 140-2 from the digital content database 125.

In step 214, the digital content identifying process 140-2 based on the comparison, identifies least one individual portion of digital content 145-N to be included in the set of digital content 180. Once the individual portions of digital content 145-N has been identified, the digital content identifying process 140-2 displays an indicator 170-N for each individual portions of digital content 145-N. The indicator 170-N represents the access information for that individual portion of digital content 145-N.

Figure 5:
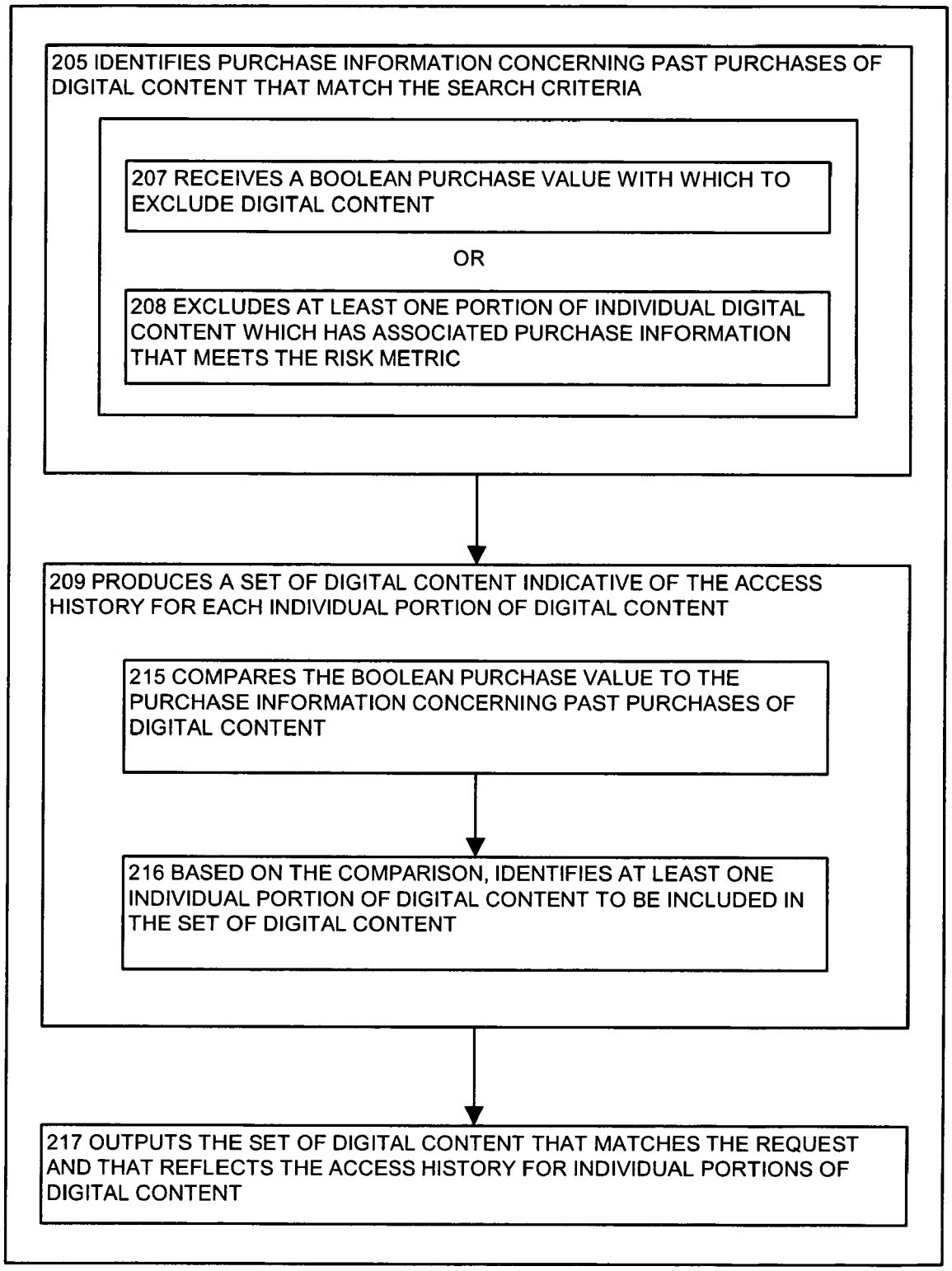
FIG. 5 illustrates a flowchart of a procedure performed by the system of FIG. 1 when the digital content identifying process identifies access information concerning past accesses of digital content that match the search criteria, according to one embodiment disclosed herein.

FIG. 5 is a flowchart of the steps performed by the digital content identifying process 140-2 when it identifies access information concerning past accesses of digital content that match the search criteria. The access information can contain information as to whether or not the digital content has been previously accessed.

In step 207, the digital content identifying process 140-2 receives a Boolean access value with which to exclude digital content. The Boolean access value could be, for example, "accessed or not accessed".

In one configuration, in step 208, the digital content identifying process 140-2 excludes at least one individual portion of digital content 145-N that has associated access information that meets the risk metric. If, for example, the risk metric is "accessed within the past six months", the digital content identifying process 140-2 could exclude, from the set of digital content 180, all individual portions of digital content 145-N that have been accessed within the past six months.

In step 215, the digital content identifying process 140-2 compares the Boolean access value to the access information concerning past accesses of digital content. The digital content identifying process 140-2 produces the set of digital content 180, in part, by comparing the Boolean access value to the access information contained as part of the access history 130-N retrieved from the digital content database 125.

In step 216, the digital content identifying process 140-2, based on the comparison, identifies least one portion of digital content to be included in the set of digital content 180. The digital content identifying process 140-2 displays the set of digital content 180 that matches Boolean access value.

FIG. 6 is a flowchart of the steps performed by the digital content identifying process 140-2 when it outputs the set of digital content 180 that matches the request and that reflects the access history 130-N for individual portions of digital content 145-N. In one configuration, a user 108 might specify search criteria, such as "accessed or purchased within the past six months" and would want additional information, along with the set of digital content 180, that indicates how many times the individual portions of digital content 145-N within the set of digital content 180, were access or purchased within that time period.

In step 219, the digital content identifying process 140-2 displays a representation of at least a portion of the access history 130-N along with the digital content. The access history 130-N can contain information regarding how many times the digital content has been access and/or how many times it has been purchased.

In step 220, the digital content identifying process 140-2 displays a rendition of each individual portion of digital content 145-N in the set of digital content 180 with an indicator 170-N, the indicator 170-N identifying access information from the access history 130-N associated with each individual portion of digital content 145-N. For example, the digital content identifying process 140-2 might display a rendition of each individual portion of digital content 145-N as a thumbnail image of the digital content, or an icon representing the digital content, along an indicator 170-N, the indicator 170-N identifying access history 130-N.

In step 221, the digital content identifying process 140-2 displays a access metric as a graphical indicator representing a number of times each individual portion of digital content 145-N is viewed versus a number of times each individual portion of digital content 145-N is purchased. The graphical indicator could be a fractional numeric value; displaying the number of times the digital content was viewed versus the number of times the digital content was purchased. The graphical indicator could be, for example, a stoplight icon, that indicates a red light (meaning not a good risk to purchase), a yellow light (meaning a moderate risk to purchase), or a green light (meaning a good risk to purchase), based on the fractional numeric value.

Alternatively, in step 222, the digital content identifying process 140-2 displays a access metric as a graphical indicator of accesses made within a predetermined period of time identified by a risk metric. The graphical indicator could be an actual numerical value of the number of accesses made within a predetermined period of time. The graphical indicator, for example, could be a meter with the number of accesses being displayed on the meter, or a thermometer with the number of accesses displayed.

Figure 7:
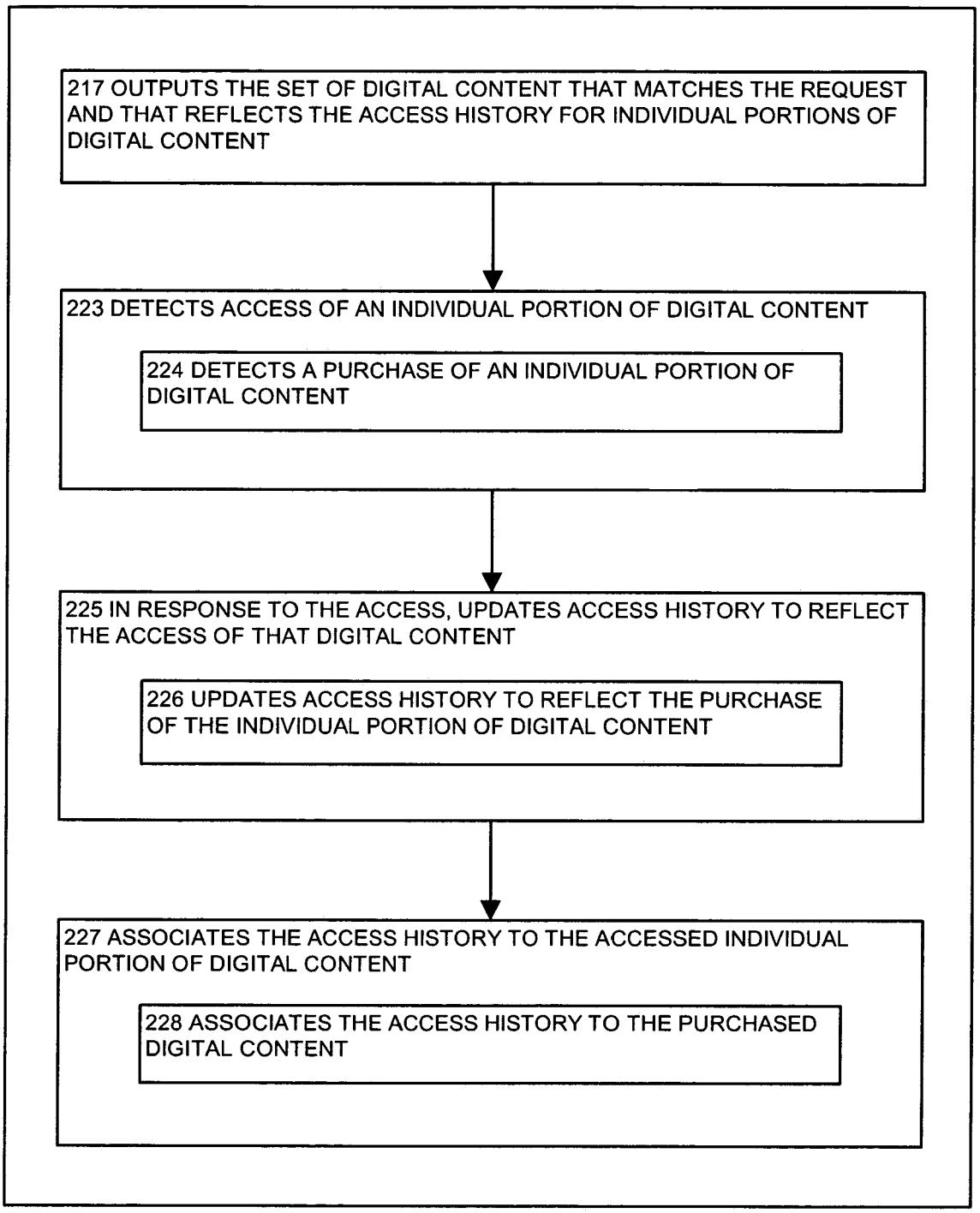
FIG. 7 illustrates a flowchart of a procedure performed by the system of FIG. 1 when the digital content identifying process outputs the set of digital content that matches the request, and that reflects the access history for individual portions of digital content, according to one embodiment disclosed herein.

FIG. 7 is a flowchart of the steps performed by the digital content identifying process 140-2 when it detects access of an individual portion of digital content 145-N. The digital content identifying process 140-2 maintains the access history 130-N (containing the purchase and viewing history of each individual portions of digital content 145-N), and updates the access history 130-N based on the access/viewing/purchase history of each individual portions of digital content 145-N).

In step 223, the digital content identifying process 140-2 detects access of an individual portion of digital content 145-N. For example, a user 108 accesses an individual portion of digital content 145-N, such as an image of a puppy, to determine whether that user 108 wants to access that image.

In one configuration, in step 224, the digital content identifying process 140-2 detects a access of an individual portion of digital content 145-N. When a user 108 accesses an individual portion of digital content 145-N, the digital content identifying process 140-2 recognizes that the image has been accessed.

In step 225, the digital content identifying process 140-2, in response to the access, updates access history 130-N to reflect the access of that digital content. When the digital content identifying process 140-2 determines that an individual portion of digital content 145-N has been accessed, the digital content identifying process 140-2 updates the access history 130-N, via the digital content database 125, with regards to that access.

In one configuration, in step 226, the digital content identifying process 140-2 updates access history 130-N to reflect the access of individual portions of digital content 145-N. If the digital content identifying process 140-2 recognizes that a user 108 has accessed an individual portion of digital content 145-N, the digital content identifying process 140-2 updates the digital content database 125 to reflect this access.

In step 227, the digital content identifying process 140-2 associates the access history 130-N to the accessed individual portions of digital content 145-N. Within the digital content database 125, the digital content identifying process 140-2 associates the access history 130-N with the access individual portions of digital content 145-N.

In one configuration, in step 228, the digital content identifying process 140-2 associates the access history 130-N to the accessed digital content. If the digital content identifying process 140-2 determines a user 108 has accessed an individual portion of digital content 145-N, the digital content identifying process 140-2 updates the digital content database 125 with the access and access information, and associates the individual portions of digital content 145-N with this updated access history 130-N.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

The invention claimed is:

1. A method comprising:
  receiving a request from a user to identify a set of digital content at a content source;
  retrieving access history for individual portions of digital content that match the request, the access history including a number of times the individual portions of digital content have been accessed from the content source by at least one other user;
  producing a set of digital content indicative of the access history for each individual portion of digital content; and
  outputting the set of digital content that matches the request and that reflects the access history for individual portions of digital content, which includes: displaying a representation of at least an individual portion of the access history along with the digital content;
  wherein receiving the request includes:
  receiving a request to identify digital image content that has a respective access history, the respective access history describing at least one access of the digital image content by at least one different user during a time range provided by the request;
  wherein retrieving access history includes:
  retrieving (i) a first access history describing at least one access of first digital image content by a first different user during the time range and (ii) a second access history describing at least one access of second digital image content by a second different user during the time range; and wherein producing the set of digital content includes:
  wherein producing the set of digital content includes:
  in response to the request:
  generating a first thumbnail representing the first digital image content having the first access history, the first digital image content identified due to the first digital content having the first access history;
  generating a second thumbnail representing the second digital image content having the second access history, the second digital image content identified due to the second digital content having the second access history; and
  identifying (i) the first access history, (ii) the first thumbnail, (iii) the second access history and (iv) the second thumbnail as respective parts of the set of digital content.

2. The method of claim 1 wherein receiving a request to identify a set of digital content comprises:
  receiving search criteria in the request; and
  wherein retrieving access history comprises:
  comparing the search criteria to a digital content database to identify individual portions of digital content that match the search criteria; and
  identifying access history for individual portions of digital content that match the search criteria;
  wherein producing a set of digital content indicative of the access history for each individual portion of digital content comprises:
  comparing the access history for each individual portion of digital content to at least one risk metric to determine if that individual portion of that digital content should be included or not in the set of digital content;
  wherein identifying access history for individual portions of digital content that match the search criteria comprises:
  identifying access information concerning past accesses of digital content that match the search criteria, the access information indicating a number of times the individual portions of digital content have been accessed; and
  wherein producing a set of digital content comprises:
  comparing the access information concerning past accesses of digital content to the risk metric; and
  based on the comparison, identifying at least one individual portion of digital content to be included in the set of digital content.

3. The method of claim 2 wherein outputting the set of digital content comprises:
  displaying, for each individual portion of digital content that is determined to be included in the set of digital content, an indicator that is representative of access information for that individual portion of digital content.

4. The method of claim 2 wherein identifying access information concerning past accesses of digital content comprises:
  receiving a threshold time value with which to exclude digital content; and wherein producing a set of digital content comprises:
  comparing the threshold time value to the access information concerning past accesses of digital content; and
  based on the comparison, identifying at least one individual portion of digital content to be included in the set of digital content.

5. The method of claim 2 wherein identifying access information concerning past accesses of digital content comprises:
  receiving a Boolean access value with which to exclude digital content; and
  wherein producing an output set identifying digital content comprises:
  comparing the Boolean access value to the access information concerning past accesses of digital content; and
  based on the comparison, identifying at least one individual portion of digital content to be included in the set of digital content.

6. The method of claim 2 wherein identifying at least one individual portion of digital content to be included in the set of digital content comprises:

excluding at least one individual portion of digital content that has associated access information that meets the risk metric.

7. The method of claim 1 wherein displaying a representation of at least an individual portion of the access history along with the digital content comprises:

displaying a rendition of each individual portion of digital content in the set of digital content with an indicator, the indicator identifying access information from the access history associated with each individual portion of digital content;

wherein displaying a rendition of each individual portion of digital content in the set of digital content with an indicator comprises:

displaying a access metric as a graphical indicator representing a number of times each individual portion of digital content is viewed versus a number of times each individual portion of digital content is accessed; and wherein displaying a rendition of each individual portion of digital content in the set of digital content with an indicator comprises:

displaying an access metric as a graphical indicator of accesses made within a predetermined period of time identified by a risk metric.

8. The method of claim 1 comprising:

detecting access of an individual portion of digital content;

in response to the access, updating access history to reflect the access of that digital content; and associating the access history to the accessed individual portion of digital content.

9. The method of claim 8 wherein detecting access of an individual portion of digital content comprises:

detecting a access of an individual portion of digital content; and wherein updating access history comprises:

updating access history to reflect the access of the individual portion of digital content; and wherein associating the access history to the accessed individual portion of digital content comprises:

associating the access history to the accessed digital content.

10. A computer readable medium including computer program logic encoded thereon that, when executed in a computerized device, identifies purchasable digital content by causing the computerized device to perform the operations of:

receiving a request from a user to identify a set of digital content at a content source;

retrieving access history for individual portions of digital content that match the request, the access history including a number of times the individual portions of digital content have been accessed from the content source by at least one other user;

producing a set of digital content indicative of the access history for each individual portion of digital content; and outputting the set of digital content that matches the request and that reflects the access history for individual portions of digital content, which includes:

displaying a representation of at least an individual portion of the access history along with the digital content;

wherein receiving the request includes:

receiving a request to identify digital image content that has a respective access history, the respective access history describing at least one access of the digital image content by at least one different user during a time range provided by the request;

wherein retrieving access history includes:

retrieving (i) a first access history describing at least one access of first digital image content by a first different user during the time range and (ii) a second access history describing at least one access of second digital image content by a second different user during the time range; and wherein producing the set of digital content includes:

wherein producing the set of digital content includes:

in response to the request:

generating a first thumbnail representing the first digital image content having the first access history, the first digital image content identified due to the first digital content having the first access history;

generating a second thumbnail representing the second digital image content having the second access history, the second digital image content identified due to the second digital content having the second access history; and identifying (i) the first access history, (ii) the first thumbnail, (iii) the second access history and (iv) the second thumbnail as respective parts of the set of digital content.

11. The computer readable medium of claim 10 wherein when the computerized device performs the operation of receiving a request to identify a set of digital content, the computerized device performs the operation of:

receiving search criteria in the request; and wherein when the computerized device performs the operation of retrieving access history, the computerized device performs the operations of:

comparing the search criteria to a digital content database to identify individual portions of digital content that match the search criteria; and identifying access history for individual portions of digital content that match the search criteria;

when the computerized device performs the operation of producing a set of digital content indicative of the access history for each individual portion of digital content, the computerized device performs the operation of:

comparing the access history for each individual portion of digital content to at least one risk metric to determine if that individual portion of that digital content should be included or not in the set of digital content.

12. The computer readable medium of claim 11 wherein when the computerized device performs the operation of identifying access history for individual portions of digital content that match the search criteria, the computerized device performs the operation of:

identifying access information concerning past accesses of digital content that match the search criteria, the access information indicating a number of times the individual portions of digital content have been accessed; and wherein when the computerized device performs the operation of producing a set of digital content, the computerized device performs the operations of:

comparing the access information concerning past accesses of digital content to the risk metric; and based on the comparison, identifying at least one individual portion of digital content to be included in the set of digital content.

13. The computer readable medium of claim 11 wherein when the computerized device performs the operation of outputting the set of digital content, the computerized device performs the operation of:
  displaying, for each individual portion of digital content that is determined to be included in the set of digital content, an indicator that is representative of access information for that individual portion of digital content.

14. The computer readable medium of claim 11 wherein when the computerized device performs the operation of identifying access information concerning past accesses of digital content, the computerized device performs the operation of:
  receiving a threshold time value with which to exclude digital content; and
  wherein when the computerized device performs the operation of producing a set of digital content, the computerized device performs the operations of:
    comparing the threshold time value to the access information concerning past accesses of digital content; and
    based on the comparison, identifying at least one individual portion of digital content to be included in the set of digital content.

15. The computer readable medium of claim 11 wherein when the computerized device performs the operation of identifying access information concerning past accesses of digital content, the computerized device performs the operation of:
  receiving a Boolean access value with which to exclude digital content; and
  wherein when the computerized device performs the operation of producing an output set identifying digital content, the computerized device performs the operations of:
    comparing the Boolean access value to the access information concerning past accesses of digital content; and
    based on the comparison, identifying at least one individual portion of digital content to be included in the set of digital content.

16. The computer readable medium of claim 11 wherein when the computerized device performs the operation of identifying at least one individual portion of digital content to be included in the set of digital content, the computerized device performs the operation of:
  excluding at least one individual portion of digital content that has associated access information that meets the risk metric.

17. The computer readable medium of claim 10 wherein when the computerized device performs the operation of displaying a representation of at least an individual portion of the access history along with the digital content, the computerized device performs the operation of:
  displaying a rendition of each individual portion of digital content in the set of digital content with an indicator, the indicator identifying access information from the access history associated with each individual portion of digital content; and
  wherein when the computerized device performs the operation of displaying a rendition of each individual portion of digital content in the set of digital content with an indicator, the computerized device performs the operation of:
    displaying an access metric as a graphical indicator representing a number of times each individual portion of digital content is viewed versus a number of times each individual portion of digital content is accessed.

18. The computer readable medium of claim 10 wherein the computerized device performs the operations of:
  detecting access of an individual portion of digital content;
  in response to the access, updating access history to reflect the access of that digital content;
  associating the access history to the accessed individual portion of digital content; and
  wherein when the computerized device performs the operation of detecting access of an individual portion of digital content, the computerized device performs the operation of:
    detecting a access of an individual portion of digital content; and
  wherein when the computerized device performs the operation of updating access history, the computerized device performs the operation of:
    updating access history to reflect the access of the individual portion of digital content; and
  wherein when the computerized device performs the operation of associating the access history to the accessed individual portion of digital content, the computerized device performs the operation of:
    associating the access history to the accessed digital content.

19. A computerized device comprising:
  a memory;
  a processor;
  a communications interface;
  an interconnection mechanism coupling the memory, the processor and the communications interface;
  where the memory is encoded with a digital content identifying application that when executed on the processor identifies purchasable digital content in the computerized device by performing the operations of:
    receiving a request from a user to identify a set of digital content at a content source;
    retrieving access history for individual portions of digital content that match the request, the access history including a number of times the individual portions of digital content have been accessed from the content source by at least one other user;
    producing a set of digital content indicative of the access history for each individual portion of digital content; and
    outputting the set of digital content that matches the request and that reflects the access history for individual portions of digital content,
    which includes:
      displaying a representation of at least an individual portion of the access history along with the digital content;
    wherein receiving the request includes:
      receiving a request to identify digital image content that has a respective access history, the respective access history describing at least one access of the digital image content by at least one different user during a time range provided by the request;
    wherein retrieving access history includes:
      retrieving (i) a first access history describing at least one access of first digital image content by a first different user during the time range and (ii) a second access history describing at least one access of second digital image content by a second different user during the time range; and wherein producing the set of digital content includes:

wherein producing the set of digital content includes:
  in response to the request:
    generating a first thumbnail representing the first digital image content having the first access history, the first digital image content identified due to the first digital content having the first access history;
    generating a second thumbnail representing the second digital image content having the second access history, the second digital image content identified due to the second digital content having the second access history; and
    identifying (i) the first access history, (ii) the first thumbnail, (iii) the second access history and (iv) the second thumbnail as respective parts of the set of digital content.

20. The method as in claim 1, comprising:
  wherein receiving the request includes:
    receiving a request to identify digital image content that has a respective access history, the respective access history describing at least one access of the digital image content by at least one different user during a time range selected by the user;
  wherein retrieving access history includes:
    retrieving (i) a first access history describing at least one access of first digital image content by a first different user during the time range and (ii) a second access history describing at least one access of second digital image content by a second different user during the time range;
  wherein producing the set of digital content includes:
  in response to the request:
    generating a first thumbnail representing the first digital image content having the first access history, the first digital image content identified due to the first digital content having the first access history;
    generating a second thumbnail representing the second digital image content having the second access history, the second digital image content identified due to the second digital content having the second access history; and
    identifying (i) the first access history, (ii) the first thumbnail, (iii) the second access history and (iv) the second thumbnail as respective parts of the set of digital content;
  wherein outputting the set of digital content includes:
    transmitting (i) the first access history, (ii) the first thumbnail, (iii) the second access history and (iv) the second thumbnail to a client device, the client device comprising a source of the request; and
  wherein displaying the representation of at least an individual portion of the access history along with the digital content includes:
    receiving a request to purchase at least one of: the first digital image content and the second digital image content, the request to purchase received after (i) the first access history has been rendered by the client device for concurrent display with a rendering of the first thumbnail and (ii) the second access history has been rendered by the client device for concurrent display with a rendering of the second thumbnail.

21. The method as in claim 1, wherein producing the set of digital content indicative of the access history for each individual portion of digital content includes:
  in response to the request:
    generating a first thumbnail representing first digital image content, the first digital image content identified due to the first digital content having a first access history describing at least one previous access of the first digital image content by at least one different user during a time range provided by the request; and
    identifying the first access history and the first thumbnail as respective parts of the set of digital content to be sent to a client device associated with a source of the request.

22. The method as in claim 21, comprising:
  wherein outputting the set of digital content includes:
    transmitting the first access history and the first thumbnail for concurrent display at the client device; and
  wherein displaying the representation of at least an individual portion of the access history along with the digital content includes:
    receiving a request to access the first digital image content, the request to access the first digital image content received after the first access history and the first thumbnail have been rendered for concurrent display at the client device.

* * * * *